Aug. 9, 1938.  J. M. WHITE  2,125,971

BRAKE

Filed Jan. 12, 1937  3 Sheets-Sheet 1

INVENTOR.
JESSE M. WHITE
BY
ATTORNEY.

Aug. 9, 1938. J. M. WHITE 2,125,971
BRAKE
Filed Jan. 12, 1937 3 Sheets-Sheet 2

INVENTOR.
JESSE M. WHITE
BY Joshua R H Potts
ATTORNEY.

Aug. 9, 1938.  J. M. WHITE  2,125,971
BRAKE
Filed Jan. 12, 1937  3 Sheets-Sheet 3

INVENTOR.
JESSE M. WHITE
BY Joshua R. H. Potts
ATTORNEY.

Patented Aug. 9, 1938

2,125,971

UNITED STATES PATENT OFFICE 2,125,971

BRAKE

Jesse M. White, Philadelphia, Pa.

Application January 12, 1937, Serial No. 120,216

2 Claims. (Cl. 188—78)

This invention has to do with brakes such as are commonly employed in automotive vehicles, and is concerned primarily with a brake of the internal expansion shoe type.

At the present time it is the almost universal practice in brake constructions of this character to employ two brake shoes which are pivotally mounted interiorly of the brake drum, and which are expanded into engagement with the drum to provide the braking effects. Due to the fact that when a nonbraking condition is to be established it is essential that the brake shoes be entirely free from the drum, the shoes are so designed that upon outward movement thereof engagement of each shoe with the drum initially takes place over a restricted zone. As a result wear on the brake shoes is localized over this relatively small zone for each shoe, with the result of shortening the service life of the brake linings which are carried by the shoes.

With the foregoing conditions in mind, this invention has in view as an important objective the provision of a brake of the internal expansion type, but which brake is characterized as including three shoes which are mounted for movement toward and away from the brake drum.

In its broader concept, this invention contemplates an arrangement in which the movement of the brake shoes towards or away from the drum is accomplished by either mechanical or fluid operated devices, and more detailed objects and advantages such as arise in connection with providing either suitable mechanical or fluid operated mechanisms, for causing movement of the brake shoes, will in part become apparent, and in part be hereinafter stated, as the description of the invention proceeds.

The invention, therefore, comprises a brake designed for use with automotive vehicles, and which brake consists of a brake drum within which are disposed three brake shoes which are mounted for movement towards and away from the drum. Suitable mechanism, either mechanical or fluid operated, is provided for causing movement of the shoes.

It is evident that with an arrangement involving the use of three shoes, as hereinafter described, the construction is maintained of a simple nature, and yet the wear on the linings is distributed over a much greater area of brake lining than in the case where only two shoes are employed, as there are three zones of localized wear, rather than two, as has heretofore been the case.

Figure 1:
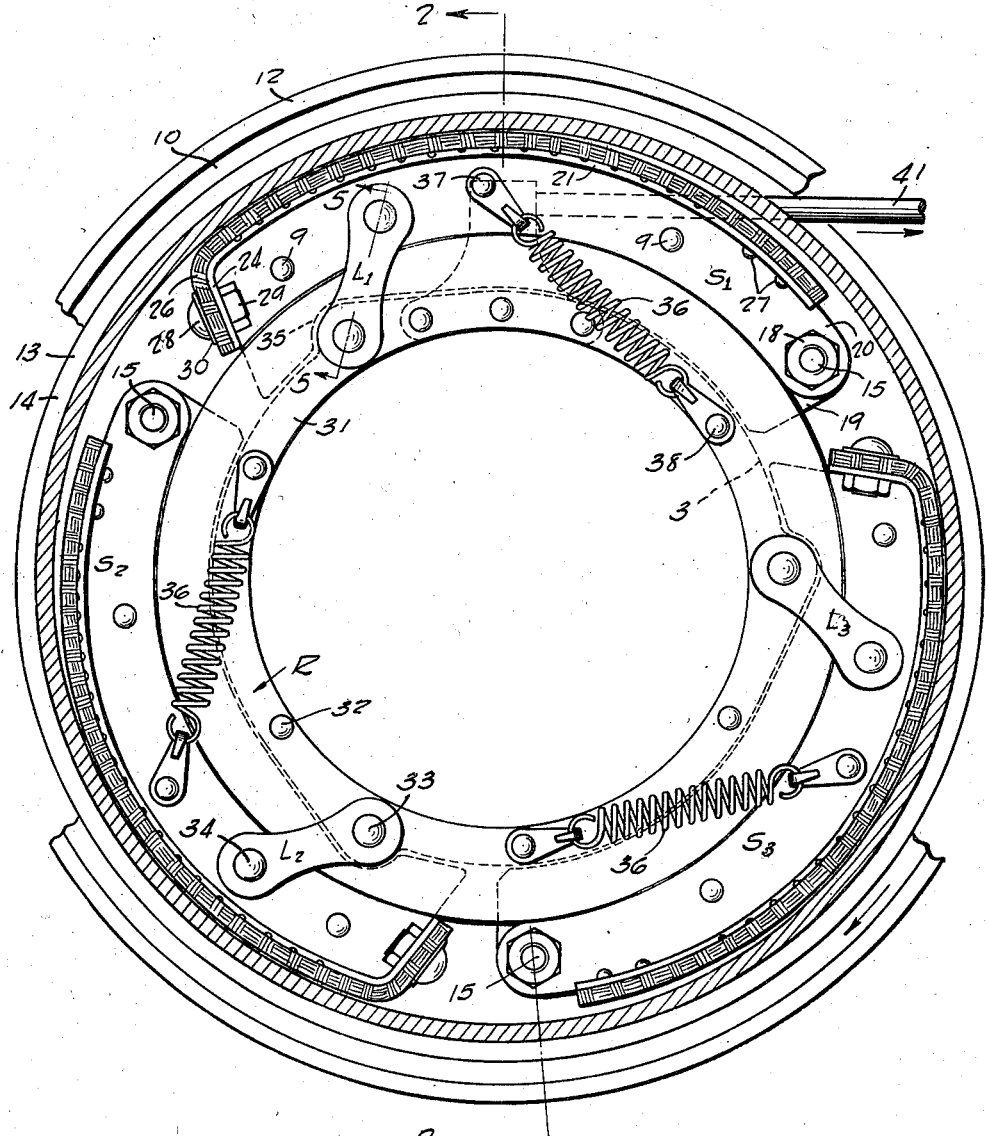
Figure 2:
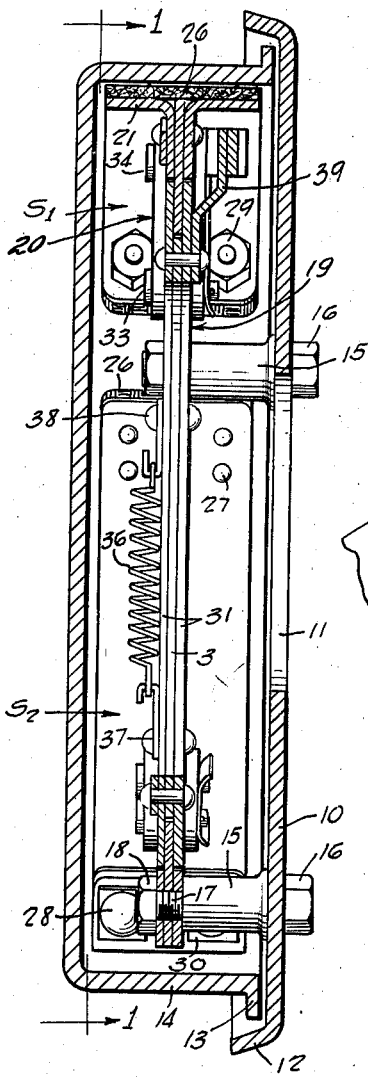
Figure 4:
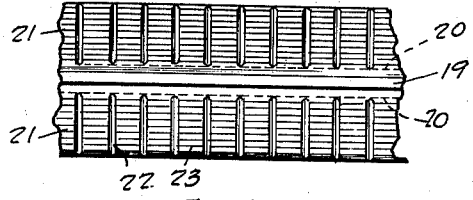
Figure 3:
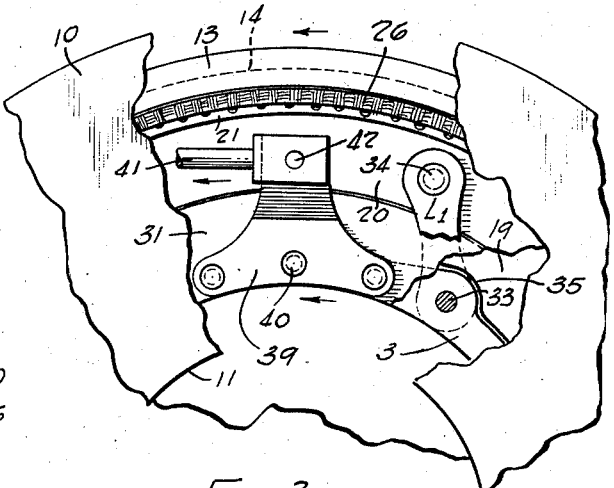
Figure 5:
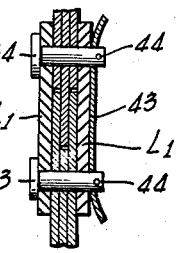
Figure 6:
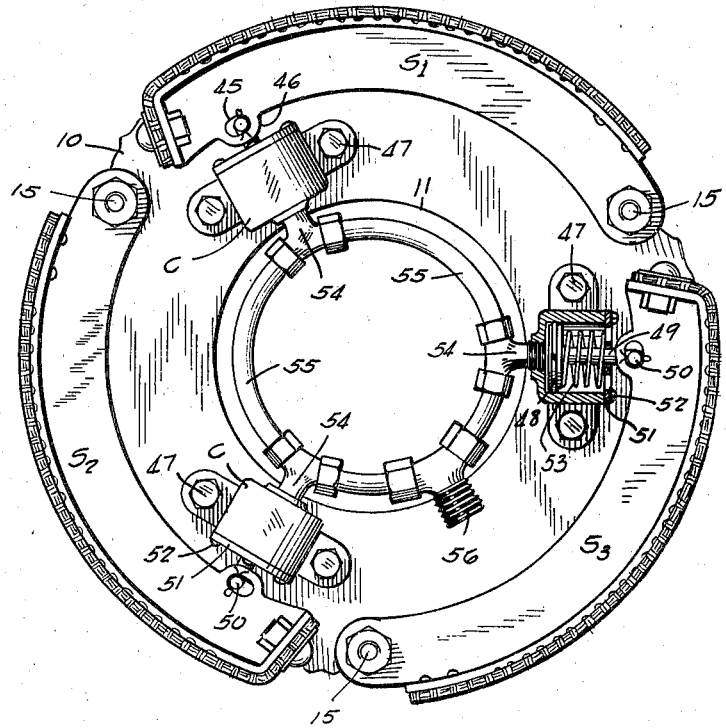

For a full and more complete understanding of the invention, reference may be had to the following description and accompanying drawings, wherein Figure 1 is a side view partly in section and partly in elevation of a brake drum and associated mechanism, made in accordance with the precepts of this invention. This view is taken about on the plane represented by the line 1—1 of Figure 2, Figure 2 is a section through the brake, taken about on the plane represented by the line 2—2 of Figure 1, Figure 3 is an elevational showing with parts broken away, bringing out the manner in which the operating instrumentalities for the brake shoes are connected to the mechanism, Figure 4 is an enlarged detailed plan view of a portion of a brake shoe surface, Figure 5 is a detailed sectional showing taken about on the plane represented by the line 5—5 of Figure 1, bringing out the arrangement of the links which connect the operating ring with the brake shoes, and Figure 6 is a showing somewhat similar to Figure 1, but with the drum omitted, bringing out one type of fluid operating mechanism for operating the brake shoes.

Referring now to the drawings, wherein like reference characters denote corresponding parts, a brake assembly such as contemplated by this invention is shown as comprising a plate 10 formed with a central opening 11 through which is adapted to pass the axle of a motor vehicle in a well-known manner.

This plate 10 is formed with an outer peripheral flange designated 12 that encompasses another flange 13 formed on a brake drum which is designated 14. The plate 10 and brake drum 14 are a well-known conventional structure. The brake drum 14 rotates with the wheel which is to be braked, whereas the plate 10 remains stationary. The brake shoes, which are included in the structure to apply the braking effects to the drum 14, are carried by this plate 10.

Extending from the plate 10 into the brake drum 14 are three pivot bolts of identical construction, these pivot bolts being identified by the reference character 15. Not only are the pivot bolts 15 of identical construction, but each of the shoe assemblies pivotally mounted thereon is also of identical construction. These shoe assemblies are referred to generally by the reference characters $S_1$, $S_2$, and $S_3$. However, for the purpose of this description it is necessary to describe the construction of only one of these pivot bolts 15 and shoes S.

The pivot bolt 15 is formed with a reduced extremity that passes through an opening in the plate 10, and on which is threaded a nut 16 for securely anchoring the bolt 15 to the plate 10. The end of the bolt 15, which is disposed within the drum 14 is also reduced, as indicated at 17, and this reduced portion is also threaded. A nut 18 is screwed on this threaded reduced portion 17, and holds in position thereon one of the brake shoes S.

One of the brake shoes S, such as the brake shoe S₁, comprises an inner member 19 and outer shoe members 20, there being an outer shoe member 20 on each side of the inner shoe member 19. It is notable that the inner shoe member 19 is wider than the outer shoe members 20, and projects radially inwardly for a greater distance than do the outer members 20; this for a purpose to be hereinafter described.

The members 19 and 20 are maintained in assembled relationship by rivets shown at 9. The outer members 20 are formed with flanges 21 which define the brake shoe surface. As shown in Figure 4, the outer surfaces of the flanges 21 are formed with transverse grooves 22, and also with circumferential cuts or lines 23 which serve to provide a roughened brake shoe surface. At one end of the brake shoe S₁ the flanges 21 are turned over, as indicated at 24, while at the other end the flanges 21 stop short of the pivot bolt 15.

A brake lining which may be of any approved fibrous material is shown at 26. This lining 26 is anchored to the flanges 21 at one end by rivets shown at 27, and at the other end by bolts 28 which pass through the lining and turned-over ends 24, and which on their inner extremities carry nuts 29 which establish a clamping relationship between the lining 26 and flanges 21.

As shown in Figure 1, a retaining strip 30 of any appropriate material may be positioned beneath the head of the bolts 28. In positioning the lining 26 with the flanges 21 the fibrous material of the lining is preferably beaten or forced down into the grooves 22 and cuts 23 to provide a firm non-slipping anchorage between the lining and the flanges 21.

The mechanism for causing movement of the brake shoes S₁, S₂ and S₃ about the pivotal bolts 15 comprises an operating ring referred to generally by the reference character R, and links designated L₁, L₂ and L₃. The ring R is of a laminated construction comprising an inner ring member 3 and outer ring members 31. The inner ring member 3 is narrower than the outer ring member 31, so that when the ring members 3 and 31 are assembled and maintained in their assembled relationship, as by rivets shown at 32, the outer ring members 31 define a groove which receives the inner shoe member 19.

Extending through the ring R are pivot members 33, which carry on each side of the ring R the links L₁, L₂ and L₃ respectively. At their other extremities these rings L are anchored to the shoes S by pivot pins 34 which extend through the members 19 and 20.

It is notable that the inner portion of the shoe member 19 which projects into the space between the outer ring members 31 is cut away, as indicated at 35, to accommodate the pivot pins 33, and allow for relative movement between the shoes S and ring member R.

Included in the mechanism are three springs 36, there being one of these springs for each of the shoes S. At one end the spring 36 is anchored to the shoe S₁, as shown at 37, while at the other extremity the spring 36 is anchored to the ring R, as indicated at 38. The spring 36 exerts an influence normally maintaining the shoes S in closed juxtaposition to the ring R. However, the ring R may be rotated against the influence of the springs 36 to cause the links L to move the shoes S outwardly, whereby the linings 26 engage the drum 14. This rotative movement on the part of the ring R may be imparted thereto through connections involving a bracket member 39, which is attached to the ring R as by rivets shown at 40, to which bracket is connected an operating member 41, as shown at 42 in Figure 3.

The pivotal pins 33 and 34 are shown in detail in Figure 5, and it is noted that a spring 43 may be included between these fastening members to take up any looseness which may occur. The springs 43 engage against the pins 44, and are carried by the pivotal members to maintain the links L snugly against the ring R and shoes S respectively, without any rattling.

The curvatures of the flanges 21 which define the braking surface of the shoe are such that when the shoes are moved outwardly the zone of initial engagement will be substantially intermediate the extremities of each shoe. With this arrangement the rivets at 27 never engage the brake drum 14. Hence scoring of the latter, or wearing down of the rivets 27 is entirely avoided.

Referring now more particularly to Figure 6, a brake arrangement involving the same general mode of operation of the shoes is there illustrated, but the mechanism is designed to operate under the influence of pressure being applied to a fluid medium, whether hydraulic or pneumatic. In this form of the invention the brake shoes S₁, S₂ and S₃ maintain the same general character. However, it is noted that each of the brake shoes S is formed with a slot 45 at the end remote from the pivot bolt 15. Adjacent the slot 45 the material of the brake shoe may be enlarged to provide an ear designated 46.

Carried by the plate 10 are a plurality of cylinders C, there being one of these cylinders for each of the brake shoes S. The cylinders C may be secured to the plate 10 in any preferred manner, as by the brackets indicated at 47. Disposed within each of the cylinders C is a piston element designated 48, and which is carried at one end of a plunger 49.

The upper end of the plunger carries a pin 50 which is received in the slot 45. A closure member for the cylinder C is shown at 51 as maintained in position by fastening elements 52. A spring 53 has one end engaging the closure element 51, while the other end abuts the piston 48. It is evident that the influence of the spring 53 is to normally maintain the piston 48 in the bottom of the cylinder C, in which position the brake shoe S₁ is in a retracted or non-engaging position.

A tubular conduit shown at 54 leads into the cylinder C on the side of the piston opposite from the spring 53, and the tubular conduits 54 for each of the cylinders C are connected by a ring-like tubular connecting member 55 which is provided with a fitting at 56 for connecting the same to a suitable source of supply of fluid under pressure.

When a fluid under pressure, whether hydraulic or pneumatic, is admitted to the fitting 56, it passes through the ring conduit 55 and to the connecting members 54 to the respective cylinders C. The effect of this fluid under pressure is to move the pistons 48 outwardly against the influence of the springs 53, and thereby urge the brake shoe S against the brake drum 14 with the desired braking effects.

While preferred specific embodiments of the invention are hereinbefore set forth, it is to be clearly understood that I am not to be limited to the exact constructions illustrated and described, because various modifications of these details may be provided in putting the invention into practice within the purview of the appended claims.

I claim:

1. A brake of the character described comprising a drum, three brake shoes disposed within said drum and pivotally mounted, each of said brake shoes being formed with a projecting tongue extending radially inwardly, an operating ring for the shoes having a groove receiving the tongues on said shoes, links disposed at an angle to the radius of the ring and connected at one end to the ring and at the other end to the brake shoes, and an operating member for causing rotation of said ring.

2. A brake of the character described comprising a drum, three brake shoes disposed within said drum and pivotally mounted, each of said brake shoes being formed with a projecting tongue extending radially inwardly, an operating ring for the shoes having a groove receiving the tongues on said shoes, links disposed at an angle to the radius of the ring and connected at one end to the ring and at the other end to the brake shoes, three springs, there being a spring anchored to each of the brake shoes at one end and to the ring at the other, said spring normally urging the shoes into engagement with the ring and away from the drum, and an operating member for causing rotation of the said ring.

JESSE M. WHITE.